United States Patent
Peyravian et al.

(10) Patent No.: US 7,607,009 B2
(45) Date of Patent: *Oct. 20, 2009

(54) METHOD FOR DISTRIBUTING AND AUTHENTICATING PUBLIC KEYS USING TIME ORDERED EXCHANGES

(75) Inventors: Mohammad Peyravian, Morrisville, NC (US); Allen Leonid Roginsky, Durham, NC (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 855 days.

This patent is subject to a terminal disclaimer.

(21) Appl. No.: 10/361,515

(22) Filed: Feb. 10, 2003

(65) Prior Publication Data

US 2004/0158708 A1    Aug. 12, 2004

(51) Int. Cl.
H04L 29/06    (2006.01)
(52) U.S. Cl. ...................................... 713/156
(58) Field of Classification Search ................ 713/171, 713/182, 156, 168
See application file for complete search history.

(56) References Cited

U.S. PATENT DOCUMENTS

| | | | | |
|---|---|---|---|---|
| 4,799,258 A | 1/1989 | Davies | ......................... | 380/21 |
| 5,920,630 A * | 7/1999 | Wertheimer et al. | ......... | 380/286 |
| 5,995,625 A * | 11/1999 | Sudia et al. | .................... | 705/51 |
| 6,091,819 A | 7/2000 | Venkatesan et al. | ............ | 380/28 |
| 6,154,543 A | 11/2000 | Baltzley | ...................... | 380/255 |
| 6,226,383 B1 | 5/2001 | Jablon | .......................... | 380/30 |
| 6,230,269 B1 * | 5/2001 | Spies et al. | .................. | 713/182 |
| 6,292,895 B1 | 9/2001 | Baltzley | ...................... | 713/168 |
| 6,317,829 B1 | 11/2001 | Van Oorschot | .............. | 713/155 |
| 6,370,250 B1 | 4/2002 | Stein | .......................... | 380/281 |
| 6,389,136 B1 | 5/2002 | Young et al. | .................. | 380/28 |
| 7,007,164 B1 * | 2/2006 | Euchner | ...................... | 713/168 |
| 2001/0054147 A1 * | 12/2001 | Richards | ...................... | 713/172 |
| 2002/0073311 A1 * | 6/2002 | Futamura et al. | ............ | 713/157 |
| 2003/0191936 A1 * | 10/2003 | Kawatsura et al. | .......... | 713/156 |
| 2003/0226017 A1 * | 12/2003 | Palekar et al. | ............... | 713/168 |

OTHER PUBLICATIONS

Schneier, Bruce. Applied Cryptography. Second Edition. John Wiley & Sons, Inc.1996. pp. 54-55.*
Schneier, Bruce. Applied Cryptography. Second Edition. John Wiley & Sons, Inc.1996. pp. 237-239.*

* cited by examiner

*Primary Examiner*—Michael J Simitoski
*Assistant Examiner*—Jason K Gee
(74) *Attorney, Agent, or Firm*—Schmeiser, Olsen & Watts; David R. Irvin

(57) ABSTRACT

A method to exchange and authenticate public cryptographic keys between parties that share a common but secret password. The parties exchange public keys, where the public keys are accompanied by hashed values based on the keys, the password, and random numbers. Each party then encrypts its random number using the public key of the other party, and the encryptions are exchanged. Based on the received encryptions and the known password, each party then re-computes the hashed value received from the other party, and compares the re-computed hashed value with the received hashed value. If the two are the same, the public key that accompanied the hashed value is judged authentic.

12 Claims, 4 Drawing Sheets

METHOD FOR DISTRIBUTING AND AUTHENTICATING PUBLIC KEYS USING TIME ORDERED EXCHANGES

CROSS REFERENCE TO RELATED APPLICATIONS

Reference is made to the inventors' commonly assigned U.S. patent applications "Method for Distributing and Authenticating Public Keys Using Hashed Password Protection," and "Method for Distributing and Authenticating Public Keys Using Random Numbers and Diffie-Hellman Public Keys," which were filed on the same day as the present application.

FIELD OF THE INVENTION

The invention relates to the field of data security, and more specifically to the field of distributing and authenticating public cryptographic keys.

BACKGROUND

Cryptography is the science of securing data. Various mechanisms have been proposed to accomplish this purpose and to defend against attacks on the security and privacy of electronic transmissions over communication channels. The most commonly used algorithms encrypt data according to a key that is known only to the sender and receiver of the transmission. These are called symmetric key algorithms, in that both the sender and the receiver share the same key, which must be kept secret. Several symmetric key algorithms are well known, perhaps the most notable among them being the Data Encryption Standard (DES) algorithm sponsored by the National Institute of Standards and Technology, and described by Schneier in *Applied Cryptography*, John Wiley and Sons (second edition, 1996). Because a symmetric algorithm's encryption key must be kept secret, the key is often distributed using public key cryptography. Public key cryptography was first proposed by Diffie and Hellman ("New Directions in Cryptography," IEEE Trans. Information Theory, vol. IT-22, no. 6, pp. 644-654, November 1976). Other public key algorithms are well known, including, for example, the RSA algorithm, as described by Rivest, Shamir, and Adelman ("A Method for Obtaining Digital Signatures and Public Key Cryptosystems," Comm. of the ACM, vol. 21. no. 2, pp. 120-126, February 1978) and the elliptic curve cryptosystem, as described by Koblitz ("Elliptic Curve Cryptosystems," Mathematics of Computation, vol. 48, no. 177, pp. 203-209, 1987) and by Miller ("Use of Elliptic Curves in Cryptography," Advances in Cryptology—Crypto '85 Proceedings, Springer-Verlag, pp. 417-426, 1986).

In public key cryptography, which employs an asymmetric algorithm, each user has a public key, which may be published and widely known, and a private key, which must be kept secret. The efficacy of public key cryptography follows from the difficulty of deriving a private key from its associated public key.

As mentioned above, an important application of public key cryptography is the distribution of symmetric encryption keys. Symmetric encryption keys that are distributed with the help of public key cryptography can be trusted to be secure and valid if all the protections are implemented and executed properly. Nevertheless, a question arises as to whether the public keys themselves can be trusted. For example, a party that publishes a public key may not in fact have possession of a corresponding private key, or the published public key may be corrupted or invalid. Encrypting sensitive data such as a symmetric encryption key using a somehow-bogus public key may result in a loss of privacy and diminished security.

Consequently, it has become important to authenticate public keys before using them, in order to ensure that public keys belong to legitimate parties. Authorities that can be trusted to do this have been set up. These authorities verify that public keys are correct and that they in fact belong to the parties claiming their ownership. Such an authority is often called a Certification Authority (CA). A CA validates a public key by issuing a certificate, which the CA signs using its own private key. A recipient of a signed certificate may then authenticate the certificate using the CAs public key to verify the signature.

This CA-based solution is often called a Public Key Infrastructure (PKI). A PKI includes the CAs, parent CAs capable of authenticating other CAs, and finally a root CA, which ultimately must be trusted, to authenticate the parent CAs. The various CAs and other parties that are part of the PKI act together according to agreed protocols and procedures. For example, ITU-T Recommendation X.509 (Information Technology—Open Systems Interconnection—The Directory: Authentication Framework, June 1997) is a widely accepted PKI standard that defines data formats and procedures pertaining to the distribution of public keys via public key certificates that are digitally signed by CAs.

Unfortunately, despite its many benefits, an X.509 PKI requires a massive and expensive infrastructure with complex operations. Thus there is a need for an alternative to the X.509 PKI that provides the same benefits but demands less in the way of bandwidth, storage, and complexity.

SUMMARY

The present invention provides an improved way to distribute and authenticate public cryptographic keys.

According to the invention, a client concatenates its ID, its public cryptographic key, a secret password known by the client and a server, and a random number known by the client, and hashes the concatenation. The client then forms an extended concatenation comprising the ID, the client's public key, and the first hashed value. The resulting extended concatenation is sent to the server. Likewise, the server concatenates the ID, its public cryptographic key, the password known by the client and a server, and a random number known by the server, and hashes the concatenation. The server then forms an extended concatenation comprising the ID, the server's public key, and the second hashed value, and sends the extended concatenation to the client. The client receives the extended concatenation from the server, reads the second hashed value and the server's public key, encrypts the random number known by the client using the server's public key, and sends the encryption to the server. Likewise, the server receives the extended concatenation from the client, reads the first hashed value and the client's public key, encrypts the random number known by the server using the client's public key, and sends the encryption to the client. The client receives and decrypts the encryption from the server, and hashes the ID, the server's public key, the password, and the random number known to the server, to provide a third hashed result, and compares the second hashed result with the third hashed result. If the two are the same, the client accepts the server's public key as valid. Likewise, the server receives and decrypts the encryption from the client, and hashes the ID, the client's public key, the password, and the random number known to the client, to provide a fourth hashed result, and compares the first hashed result with the fourth hashed result. If the two are the same, the server accepts the client's public key as valid.

DETAILED DESCRIPTION

The invention is described below in the context of a server and a client, although the invention is not limited to this context, but applies generally to two machines. In the description that follows, the client may be a user's machine, and the server may be a service provider's machine. A secret password, which may be distributed over a secure channel, is assumed to be known by both the client and the server. The password is assumed to be sufficiently long so that a random guess by either an unauthorized user or a rogue service provider is highly unlikely to be correct. Such assumptions are made today with great evident success in the context of banking. For example, a banking user may receive his or her ATM-card and its associated password separately through the mail; the password is required to have at least a specified minimum number of characters. Perhaps more apropos to the present invention, however, banks, brokers, and others rely on these same general principles to provide secure transmission of identifiers and passwords to clients using Secure Socket Layer (SSL) applications.

In the description that follows, the following notation is used:

ID—client's user identifier, which need not be kept secret;
PW—secret one-time-use password that is known by both the client and the server;
PKc—initial public key component of the client's public/private key pair;
SKc—initial private key component of the client's public/private key pair;
PKs—initial public key component of the server's public/private key pair;
SKs—initial private key component of the server's public/private key pair;
eA(B)—data B encrypted with a symmetric key A using an agreed-upon symmetric encryption algorithm;
ePK(B)—data B encrypted with an asymmetric public key PK, using an agreed-upon asymmetric encryption algorithm;
eSK(B)—data B encrypted with an asymmetric private key SK, using an agreed-upon asymmetric encryption algorithm;
Rc—a secret random number generated by the client or on behalf of the client; and
Rs—a secret random number generated by the server or on behalf of the server.

Figure 1:
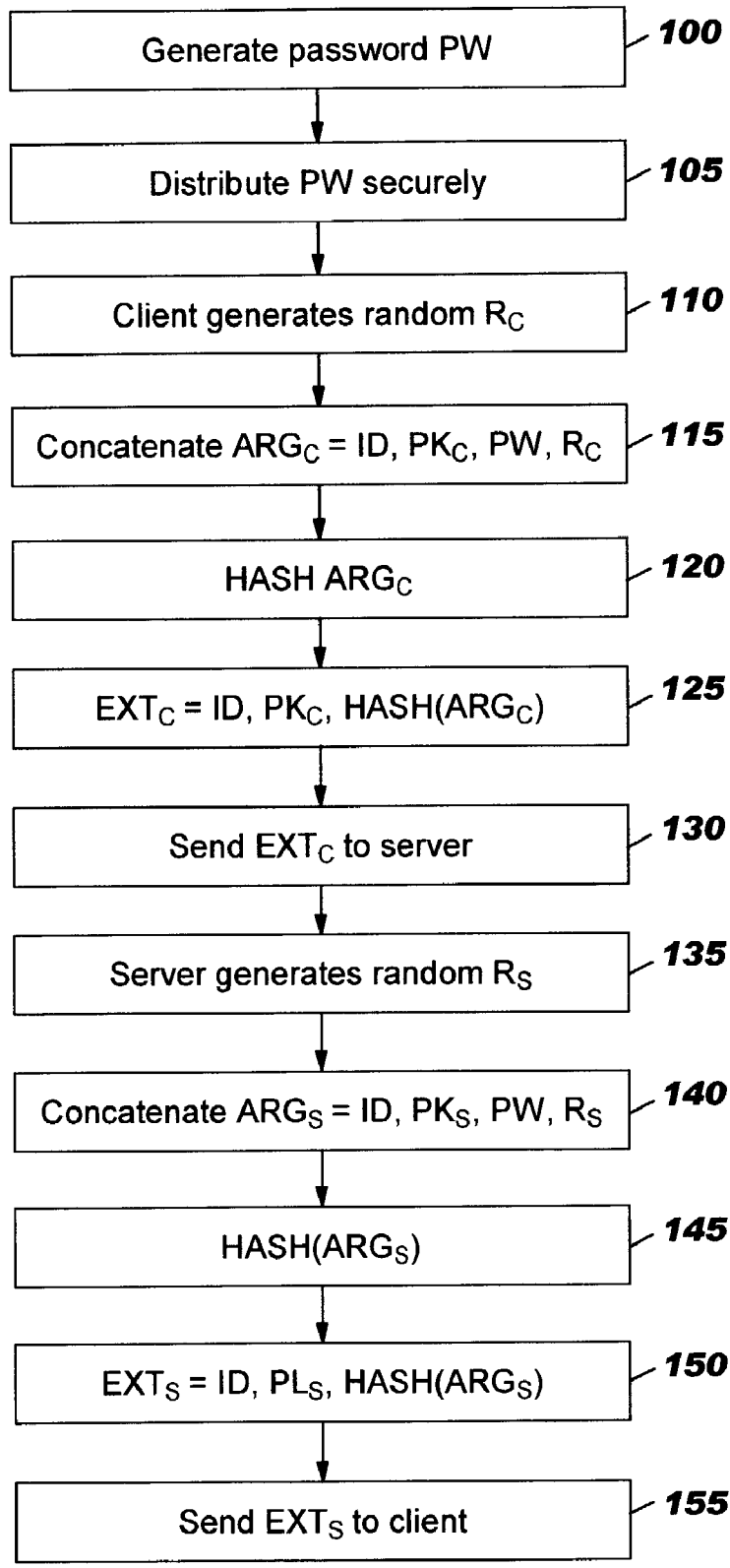
FIG. 1 shows steps of the method according to the present invention for distributing public cryptographic keys.

FIG. 1 shows steps of the method according to the present invention for distributing public cryptographic keys. As shown in FIG. 1, a password PW, which may be random, is generated using current practices (step 100), and distributed securely to the client and to a server (step 105). For example, the server may generate and send the pair (ID, PW) to the client using conventional mail, email, or telephone. Although the term password is used here, a pass phrase may be used instead, the difference between the two being only a matter of semantics regarding the number of characters involved.

The client generates a random number Rc (step 110), or reads such a random number generated on its behalf, and concatenates the client ID, the public key of the client PKc, the password PW, and the random number Rc to provide an argument ARGc, where ARGc=ID,PKc,PW,Rc (step 115). The client hashes the argument ARGc to provide a hashed value Hash(ARGc) (step 120). The hash function may be any collision-resistant hash function drawn from the art of cryptography. A preferred embodiment of the invention uses the Secure Hash Algorithm SHA-1, which is described by Schneier (op cit). Although the order of the concatenation that provides the argument ARGc is shown here for descriptive convenience as ID,PKc,PW,Rc, other permutations of the constituents of the argument ARGc may also be used. For example, the concatenation Rc,PW,PKc,ID may be used as the argument ARGc of the hash function instead of ID,PKc,PW,Rc. The client then forms an extended concatenation EXTc=ID,PKc,Hash(ARGc) (step 125), and sends the extended concatenation EXTc to the server (step 130). Again, the order of the constituents of the extended concatenation is not important.

In a similar way, the server generates a random number Rs (step 135), or reads such a random number generated on its behalf, and concatenates the client ID, the public key of the server PKs, the password PW, and the random number Rs, to provide an argument ARGs, where ARGs=ID,PKs,PW,Rs (step 140). The server hashes the argument ARGs to provide a hashed value Hash(ARGs) (step 145). The hash function may be any collision-resistant hash function drawn from the art of cryptography. A preferred embodiment of the invention uses the Secure Hash Algorithm SHA-1, which is described by Schneier (op cit). Although the order of the concatenation that provides the argument ARGs is shown here for descriptive convenience as ID,PKs,PW,Rs, other permutations of the constituents of the argument ARGs may also be used. For example, the concatenation Rs,PW,PKs,ID may be used as the argument ARGs of the hash function instead of ID,PKs, PW,Rs. The server then forms an extended concatenation EXTs=ID,PKs,Hash(ARGs) (step 150), and sends the extended concatenation EXTs to the client (step 155). Again, the order of the constituents of the extended concatenation is not important.

Figure 2:
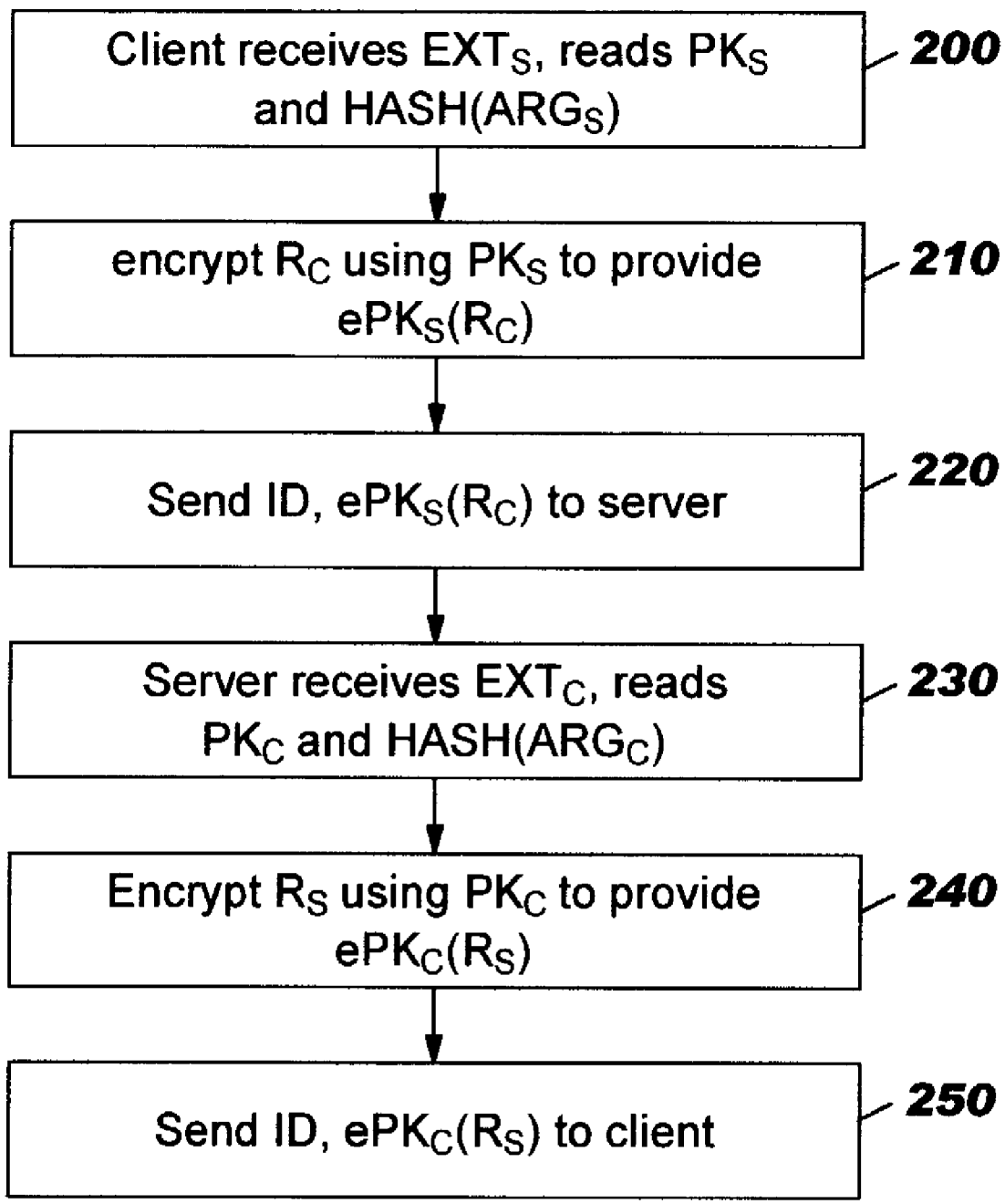
FIGS. 2-4 show steps of the method according to the present invention for authenticating public cryptographic keys distributed according to the method discussed with reference to FIG. 1.

FIG. 2 shows steps of the method according to the present invention for authenticating public cryptographic keys distributed according to the method discussed above with reference to FIG. 1. As shown in FIG. 2, the client receives the extended concatenation EXTs from the server (step 200), and now has tentative knowledge of the server's public key PKs and of Hash(ARGs). The client then encrypts the client's random number Rc using the server's public key PKs, to provide ePKs(Rc) (step 210), and sends ID,ePKs(Rc) to the server (step 220). Likewise, the server receives the extended concatenation EXTc from the client (step 230), and now has tentative knowledge of the client's public key PKc and of Hash(ARGc). The server then encrypts the server's random number Rs using the client's public key PKc, to provide ePKc(Rs) (step 240), and sends ID,ePKc(Rs) to the client (step 250).

Figure 3:
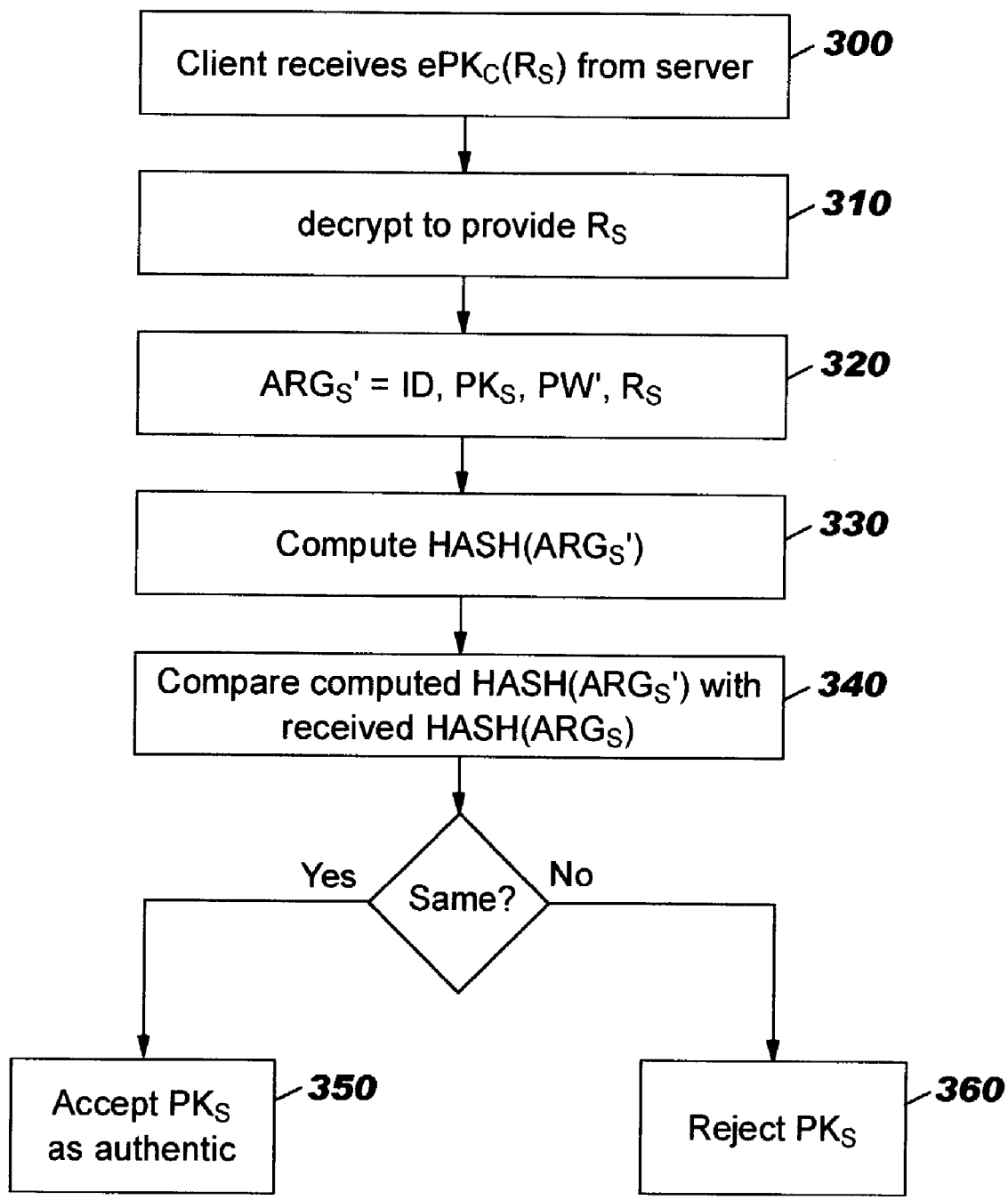

As shown in FIG. 3, the client receives ID,ePKc(Rs) from the server (step 300), and decrypts ePKc(Rs) (step 310). The client now has tentative knowledge of the server's random number Rs as well as the server's public key PKs and Hash (ARGs). The client then forms the concatenation ARGs'=ID, PKs,PW',Rs, using the client's own knowledge of the password, which is called PW' here for clarity (step 320), and computes the hashed value Hash(ARGs') (step 330). The client compares the received hashed value Hash(ARGs) with the computed hashed value Hash(ARGs') (step 340). If the two are the same, the client concludes that server knows the password and has used it properly, and therefore accepts the server's public key PKs as authentic (step 350). Otherwise, i.e., the two versions of the hashed value are not the same, the client rejects the server's public key (step 360).

Figure 4:
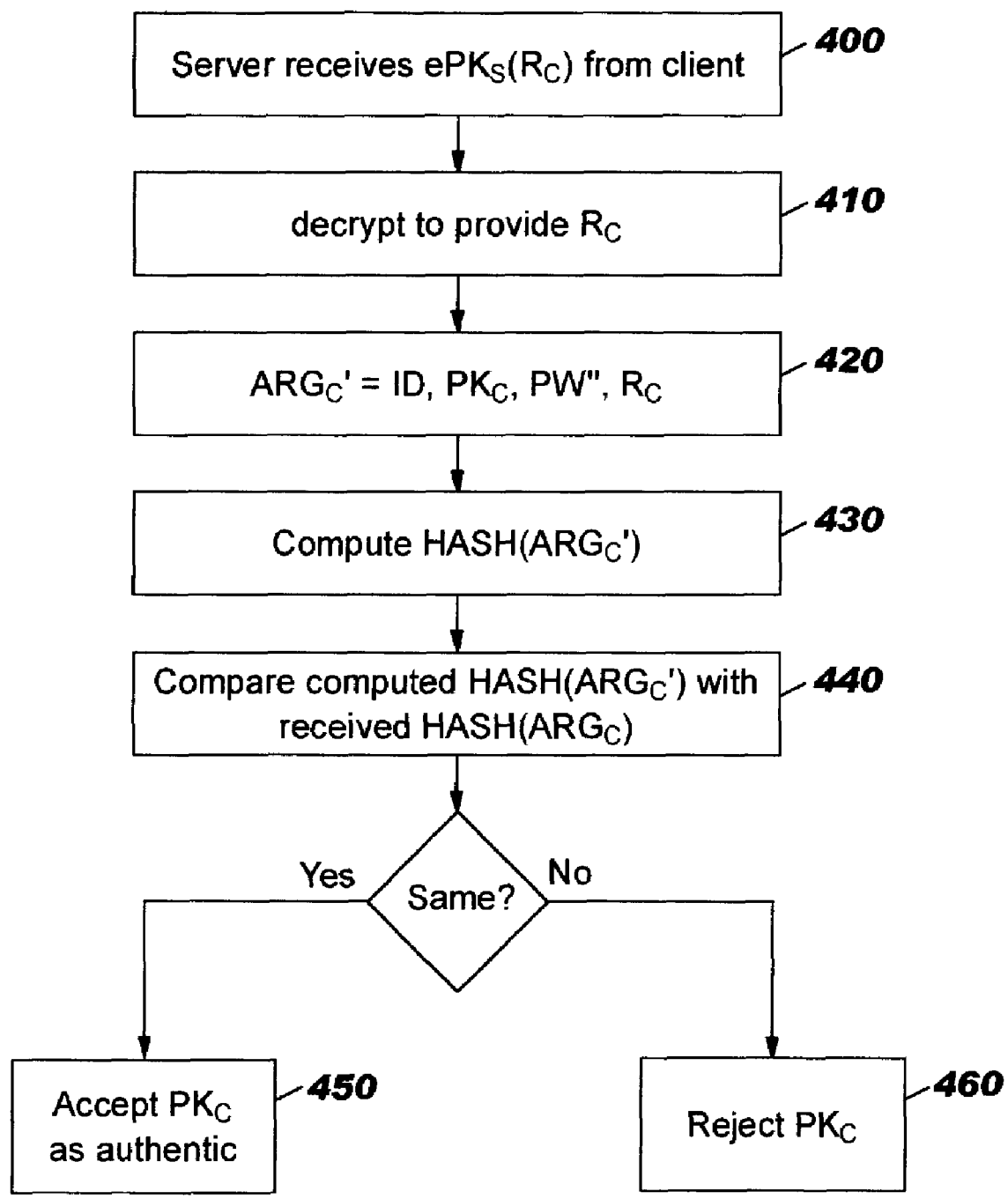

Likewise, as shown in FIG. 4, the server receives ID,ePKs(Rc) from the client (step 400), and decrypts ePKs(Rc) (step 410). The server now has tentative knowledge of the client's random number Rc as well as the client's public key PKc and Hash(ARGc). The server then forms the concatenation ARGc'=ID,PKc,PW'',Rc, using the server's own knowledge of the password, which is called PW'' here for clarity (step 420), and computes the hashed value Hash(ARGc') (step 430). The server compares the received hashed value Hash(ARGc) with the computed hashed value Hash(ARGc') (step 440). If the two are the same, the server concludes that client knows the password and has used it properly, and therefore accepts the client's public key PKc as authentic (step 450). Otherwise, i.e., the two versions of the hashed value are not the same, the server rejects the client's public key (step 460).

Thus the server has authenticated the client, and the client has authenticated the server. Now the client and the server can use public key cryptography further, with confidence that the public keys are authentic. The client and the server may discard the password PW, as it is not used again. Neither the client nor the server accept any further messages supposedly protected according to PW. Moreover, at this point there is no longer any need to keep PW secret, as PW has been used only for authentication rather than for encryption of sensitive data.

In the embodiment of the invention described above, the client authenticates the server, and the server authenticates the client. It is not a necessary condition of the invention that both the server and the client be authenticated. For example, the client may authenticate the server as described below, without requiring that the server also authenticate the client. This may be done with a subset of the steps of the first embodiment of the invention, as follows:

The client generates a random number Rc (FIG. 1, step 110), or reads such a random number generated on its behalf, and concatenates the client ID, the public key of the client PKc, the password PW, and the random number Rc to provide an argument ARGc, where ARGc=ID,PKc,PW,Rc (step 115). The client hashes the argument ARGc to provide a hashed value Hash(ARGc) (step 120). The client then forms an extended concatenation EXTc=ID,PKc,Hash(ARGc) (step 125), and sends the extended concatenation EXTc to the server (step 130). This embodiment of the invention requires sending PKc to the server; sending any of the other constituents of EXTc to the server is optional in this embodiment.

The server generates a random number Rs (step 135), or reads such a random number generated on its behalf, and concatenates the client ID, the public key of the server PKs, the password PW, and the random number Rs, to provide an argument ARGs, where ARGs=ID,PKs,PW,Rs (step 140). The server hashes the argument ARGs to provide a hashed value Hash(ARGs) (step 145). The server then forms an extended concatenation EXTs=ID,PKs,Hash(ARGs) (step 150), and sends the extended concatenation EXTs to the client (step 155).

The client receives the extended concatenation EXTs from the server (FIG. 2, step 200), and now has tentative knowledge of the server's public key PKs and of Hash(ARGs). Likewise, the server receives the extended concatenation EXTc from the client (step 230), and now has tentative knowledge of the client's public key PKc and of Hash(ARGc). The server then encrypts the server's random number Rs using the client's public key PKc, to provide ePKc(Rs) (step 240), and sends ID,ePKc(Rs) to the client (step 250).

The client receives ID,ePKc(Rs) from the server (FIG. 3, step 300), and decrypts ePKc(Rs) (step 310). The client now has tentative knowledge of the server's random number Rs as well as the server's public key PKs and Hash(ARGs). The client then forms the concatenation ARGs'=ID,PKs,PW',Rs, using the client's own knowledge of the password, which is called PW' here for clarity (step 320), and computes the hashed value Hash(ARGs') (step 330). The client compares the received hashed value Hash(ARGs) with the computed hashed value Hash(ARGs') (step 340). If the two are the same, the client concludes that server knows the password and has used it properly, and therefore accepts the server's public key PKs as authentic (step 350). Otherwise, i.e., the two versions of the hashed value are not the same, the client rejects the server's public key (step 360).

Thus the client has authenticated the server. In another embodiment, the server may authenticate the client using the same logic. More generally, a first machine, which may also be called a receiving machine, may authenticate a second machine, which may also be called a distributing machine, without regard to either machine's role in any client-server context.

It is important to note that the flows described above can be added to the top of current Secure Socket Layer (SSL) architectures to provide public key distribution without affecting the underlying applications. Since most SSL applications require password-based authentication of the client, the client can then generate a password PWc and send it to the server as the concatenation ID,ePKs(PWc,Rc),eSKc(Hash(ID,PWc,Rc)). This allows current SSL applications to continue using their current password-based authentications as well, since the additions will be transparent to the existing application.

The method described above may be used to recover when either the client or the server has knowledge that its private key SKc or SKs, respectively, is compromised. If the client's private key SKc is compromised, the client sends an "SKc compromised" message to the server in the concatenation ID,"SKc compromised",eSKc(Hash(ID,"SKc compromised")). If the server has the client's public key, the server verifies the signature. If the signature is valid, the client and server suspend the exchange of data while the client determines a new public key and private key. The client then sends its new public key to the server as described above. If the server does not have the client's public key, or if the signature is invalid, the server ignores the message.

If the server's private key SK is compromised, the server sends an "SKs compromised" message to the client in the concatenation ID,"SKs compromised",eSKs(Hash(ID,"SKs compromised")). If the client has the server's public key, the client verifies the signature. If the signature is valid, the client and server suspend the exchange of data while the server determines a new public key and private key. The server then sends its new public key to the client as described above. If the client does not have the server's public key, or if the signature is invalid, the client ignores the message.

From the foregoing description, those skilled in the art will now appreciate that the present invention provides an economical alternative to an X.509 PKI for distributing and authenticating public cryptographic keys. The foregoing description is illustrative rather than limiting, however, and the invention is limited only by the claims that follow.

We claim:

1. A method for a first machine to distribute a public cryptographic key to a second machine, comprising the steps of:
the first machine receiving from the second machine a pair of parameters consisting of an identifier of the first machine and a secret password in response to the second machine having generated the secret password;
the first machine hashing an argument that includes the received identifier, a public cryptographic key of a public/private key pair of the first machine, the secret password, and a random number known by the first machine, to provide a hashed value; and
said first machine sending the identifier of the first machine, the public cryptographic key of the public/private key pair of the first machine, and the hashed value to the second machine.

2. The method of claim 1, wherein the first machine is a server and the second machine is a client.

3. The method of claim 1, wherein the first machine is a client and the second machine is a server.

4. The method of claim 1, wherein the argument consists of the identifier of the first machine, the public cryptographic key of the public/private key pair of the first machine, the password, and the random number known by the first machine.

5. The method of claim 4, wherein the argument is a concatenation of the identifier of the first machine, the public cryptographic key of the public/private key pair of the first machine, the password, and the random number known by the first machine.

6. A method for a receiving machine to authenticate a public cryptographic key of a distributing machine, comprising the steps of:
receiving, by a receiving machine from a distributing machine, a public cryptographic key of a public/private key pair of the distributing machine and a hashed value of a first argument, said first argument comprising an identifier of the receiving machine, the public cryptographic key of the Public/private key pair of the distributing machine, a secret password known by the distributing machine and the receiving machine, and a random number known by the distributing machine;
after said receiving the public cryptographic key of the public/private key pair of the distributing machine and the hashed value of the first argument, receiving, by the receiving machine from the distributing machine, an encryption of a random argument consisting of the random number known by the distributing machine, wherein the encryption was generated using a public cryptographic key of a public/private key pair of the receiving machine;
by the receiving machine, decrypting the encryption to provide the random number known by the distributing machine;
hashing, by the receiving machine, a second argument, said second argument comprising the identifier of the receiving machine, the public cryptographic key of the public/private key pair of the distributing machine, the password, and the random number known to the distributing machine as decrypted by the receiving machine, to provide a hashed value of the second argument;
comparing the hashed value of the first argument with the hashed value of the second argument;
ascertaining that the hashed value of the first argument is the same as the hashed value of the second argument; and
responsive to said ascertaining, accepting the public cryptographic key of the distributing machine as authentic.

7. The method of claim 6, wherein the receiving machine is a client and the distributing machine is a server.

8. The method of claim 6, wherein the receiving machine is a server and the distributing machine is a client.

9. The method of claim 6,
wherein the first argument consists of the identifier of the receiving machine, the public cryptographic key of the public/private key pair of the distributing machine, the password, and the random number known by the distributing machine; and
wherein the second argument consists of the identifier of the receiving machine, the public cryptographic key of the public/private key pair of the distributing machine, the password, and the random number known to the distributing machine as decrypted by the receiving machine.

10. The method of claim 9,
wherein the first argument is a concatenation of the identifier of the receiving machine, the public cryptographic key of the public/private key pair of the distributing machine, the password, and the random number known by the distributing machine; and
wherein the second argument is a concatenation of the identifier of the receiving machine, the public cryptographic key of the public/private key pair of the distributing machine, the password, and the random number known to the distributing machine as decrypted by the receiving machine.

11. A method for distributing and authenticating public cryptographic keys, comprising the steps of:
by a client, concatenating an identifier, a public cryptographic key of the client, a secret password known by the client and a server, and a random number known by the client, to provide a first argument; hashing the first argument to provide a first hashed value; concatenating the identifier, the public cryptographic key of the client, and the first hashed value, to provide an extended concatenation of the client; and sending the extended concatenation of the client to the server;
by the server, concatenating the identifier, a public cryptographic key of the server, the password, and a random number known by the server, to provide a second argument; hashing the second argument to provide a second hashed value; concatenating the identifier, the public cryptographic key of the server, and the second hashed value, to provide an extended concatenation of the server; and sending the extended concatenation of the server to the client;
by the client, receiving the extended concatenation of the server, reading the public encryption key of the server from the extended concatenation of the server, and sending to the server an encryption, using the public encryption key of the server read from the extended concatenation of the server, of the random number known by the client;
by the server, receiving the extended concatenation of the client, reading the public encryption key of the client from the extended concatenation of the client, and sending to the client an encryption, using the public encryption key of the client read from the extended concatenation of the client, of the random number known by the server;
by the client, receiving the encryption of the random number known by the server, decrypting the encryption of the random number known by the server to provide the random number known by the server, concatenating the public cryptographic key of the server, the random number known by the server, and the password, to provide a third argument; hashing the third argument to provide a third hashed value; comparing the second hashed value with the third hashed value; and, if the second hashed value and the third hashed value are the same, concluding that the public cryptographic key of the extended concatenation of the server is authentic; and by the server, receiving the encryption of the random number known by the client, decrypting the encryption of the random number known by the client to provide the random number known by the client, concatenating the public cryptographic key of the client, the random number known by the client, and the password, to provide a fourth argument; hashing the fourth argument to provide a fourth hashed value; comparing the first hashed value with the fourth hashed value;

ascertaining that the first hashed value and the fourth hashed value are the same; and responsive to said ascertaining, concluding that the public cryptographic key of the extended concatenation of the client is authentic.

12. The method of claim 11, wherein the first argument consists of the identifier, the public cryptographic key of the client, the password, and the random number known by the client;

wherein the extended concatenation of the client consists of the identifier, the public cryptographic key of the client, and the first hashed value;

wherein the second argument consists of the identifier, the public cryptographic key of the server, the password, and the random number known by the server; and wherein the extended concatenation of the server consists of the identifier, the public cryptographic key of the server, and the second hashed value.

\* \* \* \* \*